Patented July 7, 1942

2,289,317

UNITED STATES PATENT OFFICE 2,289,317

PRESSURE GENERATING PROPULSIVE
CHARGE FOR PRIME MOVERS

Carl D. Pratt, Tamaqua, Pa., assignor to Atlas
Powder Company, Wilmington, Del., a corporation of Delaware No Drawing. Application September 14, 1932,
Serial No. 633,215

9 Claims. (Cl. 102—12)

This invention relates to new and useful improvements in substantially solid deflagrating propellants used as the fuel or source of power for the operation of internal combustion engines, motor starters, switch closers and other types of prime-movers.

It has for its main object the overcoming of difficulties that have heretofore existed with the use of propellants for such purposes and the provision of a means whereby much more reliable, safe and practicable results are obtained than previously were considered possible in the operation of various types of prime-movers, such as motors and other devices capable of transforming the propellants' energy into useful work, such as, for example, by the actuation of a movable piston in a cylinder. Other objects will be evident from the following description of my invention.

When propellants, such as gun-powder and the like are employed in ammunition to propel projectiles, etc., the propellant is invariably placed in direct relation with the movable element, with little or no spacing involved. For instance, in small arms ammunition, the movable element (projectile) is built directly in the cartridge with the propellant, with or without intervening sealing wads. Also, in the case of artillery, the propellant is often charged separately into the gun behind the projectile, but always in such manner that little or no unoccupied space is involved between the breech of the gun and the movable projectile.

In contradistinction to the adaptation of propellants in guns and ammunition, with substantially no spaced relation with respect to the movable element, it is always desirable and usually very essential to provide some space between the propellant and the movable element in a prime-mover; particularly when the movable element operates in a cycle, such as for example, a piston that moves back and forth in a cylinder. Such a space serves as the shock absorber to prevent the propellant initially deflagrating at too high a speed and building up too high a pressure prior to the movement of the movable element and the overcoming of its inertia. Without such a space, either a propellant having an exceedingly slow speed of deflagration would have to be employed or the machine would have to be built exceptionally strong and heavy to withstand the initial pressures from propellants having normal speeds of deflagration. To provide a satisfactorily slow propellant for use without spacing, would offer considerable difficulties, however, especially to provide one that will be dependably ignited by ordinary means and whose velocity of deflagration would, at the same time, not be accelerated to an objectionable degree by the development of sufficient pressure to overcome the inertia of the movable element. On the other hand, it would be prohibitive, in most cases, to provide the devices with sufficient weight and strength to safely withstand the amounts of ordinary propellants usually required for the work involved, due to the high initial pressures developed prior to the overcoming of the inertia of the movable element or elements. Not only would such strong and heavy prime-movers be involved as to make them very cumbersome and uneconomical, but also in many cases, and particularly when used as starting devices for aircraft motors, their weights would be prohibitive.

In the practical operation of prime-movers of the type described, certain very important requisites have been found to be involved, as for example (1) limited violence of action, (2) non-corrosion of the metal parts of the devices, (3) minimum amount of residue to interfere with the proper action and lubrication of movable parts and (4) minimum erosion by heat. After extended study and experimentation toward the development of an ideal fuel to conform with these requisites, I have found colloided nitrocellulose to be by far the most satisfactory fuel base, in that it is relatively slow in speed of deflagration, its products of deflagration are relatively non-corrosive, it yields practically no solid residue and it develops a relatively low amount of heat and a relatively high amount of gaseous products.

In the use of such straight colloided nitrocellulose propellent fuels, I have encountered serious difficulty, however, which makes these fuels very non-dependable and inefficient, as well as hazardous for use in prime-movers, in spaced relation with the movable elements thereof. This difficulty is manifested by frequent partial or total failures of the prime-movers to operate as and when desired and by partially and/or entirely unconsumed fuel particles interfering with the proper functioning of the devices in many instances. Great hazard has also been manifested by the actual wrecking of prime-movers and associated machinery as well as the potential possibility of serious injury to operatives in the vicinity, due to the accumulations of unconsumed fuel in the systems of the prime-movers, which eventually deflagrate all at once, simultaneously with a new charge, the added power of which is the offending element.

I have proved by extensive experimentation that the above difficulty is due to a tendency on the part of straight colloided nitrocellulose fuels of being too easily extinguished prior to their complete deflagration, subsequent to their being originally ignited. This tendency I term "quenchableness."

This objectionable fuel quenching phenomenon I believe to be caused by the sudden cooling effect of the expansion of the propellant's gases together with the rapid movement of the deflagrating particles of the propellant through the shock absorbing space provided between the movable element and the propellant's original location. Thus it will be seen that there is a direct cooperative relation between the novel propellant fuel hereinafter described and claimed and a prime mover propelled thereby and comprising a shock absorbing space between the prime mover proper and the point at which the fuel is ignited, and through which space the fuel is propelled and in which space the ignition of the fuel is progressively continued during the travel of the fuel therethrough. This cooperative relation resides in the fact that the space or expansion chamber is necessary to reduce shock and jar upon the parts to be propelled while the ignition maintaining or quenchableness reducing element of the fuel keeps up the ignition and burning of the relatively slow burning content of the fuel in the face of the adverse conditions caused by the pressure drop encountered by the fuel as it is carried from a closely confined condition into one where it is much less closely confined. Therefore, where the term "of the type described" is used in the claims in referring to the prime mover it is to be understood to mean a prime mover comprising an expansion chamber between the prime mover proper and the point of ignition of the fuel. The particular type of prime mover to be employed is not material as I do not claim the invention of a specific type of motor to be propelled. What I do claim as new and highly useful is the provision of a fuel (such as colloided nitrocellulose for example) which is relatively slow burning, as contrasted with highly explosive compositions, (black powder for example) and an ignition maintaining or quenchableness reducing ingredient in said fuel, serving to maintain igniton of the nitrocellulose during its passage from the point of its ignition, and through an interposed expansion chamber to the prime mover proper (engine cylinder for example).

The phenomenon is accentuated by having the propellant fuel enclosed in an originally tight envelope, such as for example a shot gun shell, the confining wall of which must be ruptured by the developed pressure of the ignited propellant, in order to emit the hot gases therefrom. In such cases, the sudden rupturing of the tight confining envelope greatly increases the likelihood of the propellant being extinguished concurrently therewith, besides imparting a higher velocity to the ignited propellant particles within the shock-absorbing space, which also adds to their likelihood of being extinguished. This is borne out by the fact that I have been able to greatly decrease the likelihood of extinguishing the ignited propellants by using a vented envelope as the original container for the propellant, such as for example by slitting, perforating or weakening the top confining wad in the case of a shot gun shell type of envelope.

The mere weakening and/or venting of the confining envelope does not entirely solve the problem, however, and also entails several objections, as for example, (1) decreased protection against moisture, water, etc.; (2) greater likelihood of spilling the fuel through handling and shipment; etc. It fails to solve the problem in that the fuel or propellant still has the likelihood of becoming extinguished by its swift movement through the shock-absorbing space, even though it emerges from the original envelope in an ignited state; this likelihood being increased with decreasing temperature conditions.

While I also recognize the advantage of having an obstructing screen or grid in the vicinity of the original envelope or cartridge of fuel, which will limit the distance over which the ignited fuel will be thrown, yet such a scheme is often impracticable and/or inefficient, as the greatest inefficiency will be obtained by having the bulk of the fuel deflagrating as close to the movable element as possible. For example, in airplane engine starting devices, it is desirable to have the chamber (in which the fuel cartridge is ignited) in the cock-pit of the plane, whereas the starter is attached some distance away from that point, directly connected with the engine. In such cases, it is extremely advantageous to bring the ignited fuel as close to the starter proper, as possible, which necessitates propelling the ignited fuel from the firing chamber to the burning chamber of the starting device, in which most of the fuel will be eventually completely consumed.

In spite of such helpful possibilities as weakened fuel envelopes, obstructing screens, etc., sound reasoning will not permit one to depend entirely on such schemes, in view of so much depending upon the reliability of operation of most types of prime-movers that are contemplated to be actuated by essentially solid deflagrating fuels. For example, in the operation of automatic switch closers, the operation must be absolutely sure, as no operative may be present to take care of trouble resulting from a possible misfire. Likewise, in aircraft engine starters, dependability is of prime importance, and this dependability must extend throughout very low operating temperatures.

In accordance with my invention, I have found, however, that complete operating dependability is attained for various types of prime-movers, by using a fuel having a colloided nitrocellulose base, so modified that its quenchableness is satisfactorily reduced, without objectionably effecting its other advantageous qualities which conform to such requisites as slow action, non-corrosion, non-erosion, low residues, etc.

There are, within the scope of my invention, various means of modifying the colloided nitrocellulose fuels, the selection of which means depends upon the degree of non-quenchableness desired for the particular prime-mover and temperature conditions involved. Examples of effective and satisfactory means are (1) increased aeration of the colloided nitrocellulose as by limiting the degree to which it is colloided, (2) the use of nitroglycerine as an ingredient, (3) the use of an oxygen delivering salt as an ingredient, etc. Any one or a combination of more than one modification means may be used, within my invention. I may also use straight colloided nitrocellulose fuels in combination with less quenchable fuels. In fact, I prefer the latter method of application as I am thus permitted to employ a minor proportion of a fuel having a very low degree of quenchableness in combination with a major proportion of the more quenchable straight colloided nitrocellulose fuel, which combination has a minimum effect on the aggregate speed of deflagration and other desirable properties of the total charge, with maximum effectiveness in so far as quenchableness is concerned; the less quenchable component serving to keep ignited and/or to reignite, the more quenchable colloided nitrocellulose component. Such combinations may be used either as straight blends with the particles of the less quenchable fuel being intermixed with those of the more quenchable colloided nitrocellulose fuel or with the less quenchable fuel as a separate charge, preferably located in such a position as to be ignited directly by the ignition device employed. The blending method is preferred as it permits of greater simplicity and economy in the loading of the fuel cartridges; only one instead of two charging operations being necessary.

The following examples of fuel charges, made in accordance with my invention, are merely given for clarity and are not to be considered limiting:

1. A fuel charge consisting of about 2.5 grams of a solid colloided fuel consisting essentially of about 70% nitrocellulose and about 30% nitroglycerine the grains being about .1" in diameter by about .25" long with one longitudinal perforation as the less quenchable fuel charge and 12 grams of a straight colloided nitrocellulose fuel whose grains are about .155" in diameter by about $\frac{3}{16}$" long with no perforations; the less quenchable fuel charge being in immediate contact with the igniting element and the more quenchable charge being superimposed thereon. Very satisfactory and dependable results are obtained with the above charge, when employed to actuate a starter attached to a 450 H. P. Liberty Motor, at normal temperatures; the fuel being initiated by means of an electric fusehead.

2. A fuel charge of 18 grams of a fuel mixture consisting of about 80% of straight colloided nitrocellulose in grains about .19" diameter by about $\frac{3}{16}$" long with no perforations and about 20% of a modified fuel consisting of about 69% colloided nitrocellulose, about 29% nitroglycerine and 2% potassium nitrate in grains about .17" in diameter by $\frac{3}{16}$" long with three longitudinal perforations. Satisfactory and dependable results are obtained with the above charge, when employed to actuate a starter attached to a 450 H. P. Liberty Motor, at a temperature of about 15° F.; the fuel being initiated by means of an electric fuse-head.

3. A fuel charge consisting of colloided nitrocellulose powder comprising about 3% potassium nitrate incorporated therewith, the grains being about .2" in diameter by $\frac{3}{16}$" long.

The invention contemplates the employment of any means of maintaining the ignition of the colloided nitrocellulose charge under the conditions indicated, i. e., where said charge is discharged into a considerable space between its point of ignition and the point where its pressure is to act upon a part to be moved. It would, of course, be very easy, by adding a substantial quantity of nitroglycerine or other rapidly burning explosive type substance to insure the complete burning of the nitrocellulose fuel with a correspondingly greatly increased speed of burning. My invention differs from this obvious thought, however, in that, what is desired is to maintain a relatively low rate of burning of the nitrocellulose while at the same time decreasing its quenchability, or, in other words, while maintaining ignition throughout the mass of nitrocellulose.

It is desired to minimize the shock and jar incident to the setting off of the fuel and its action in overcoming the inertia of the part to be started, at as low a point as possible. This is accomplished by the use of a relatively slow burning fuel such as colloided nitrocellulose of the character described, and it will be clear that this advantage of elimination of shock and jar should be maintained. Therefore, it is to be understood that I contemplate employing only that amount of less quenchable material (nitroglycerine) and/or oxygen carrying salt necessary to insure maintenance of ignition and not enough to convert the action of the colloided nitrocellulose alone (with its relatively slow, pressure building and pushing action) into an explosive impact.

I am aware of the fact that it is common in the blasting art to manufacture some explosives in such manner that they will yield the pushing or heaving action of black powder and to manufacture other explosives in such manner that they will yield the sharp shattering effect characteristic of nitroglycerine. However, as far as I am aware, I am the first to combine colloided nitrocellulose with another substance in such manner that the colloided nitrocellulose delivers pushing and propulsive gases into and through a confined space connected to a prime mover while the other substance prevents the quenching of the colloided nitrocellulose as it is carried through said space, so that some of the nitrocellulose may do its final work of pressure building at a point remote from the point of ignition and close to the point of application of the power.

It should be understood that fuel charges, fabricated in accordance with my invention, may be employed in any suitable form and size and/or contained in any suitable type of shell or envelope. They may also be initiated in any suitable manner as by means of percussion caps, electric fuse-heads, etc.; I having found electric fuse-heads to be preferable, however, on account of greater dependability, less violence of initiation, etc.

When employing an oxygen delivering salt ingredient as a means of decreasing the quenchability of the fuel, it should be remembered that a minimum amount should be used, in order to minimize the amount of residue. Various salts are suitable as for example, alkali nitrates, chromates, dichromates, chlorates, etc.; potassium or barium nitrates being preferred on account of their low hygroscopicity, whereas chlorates are not very desirable where corrosion must be prevented.

Having described my invention, what I claim is:

1. A propulsive, projectile-free, prime mover actuating type of fuel cartridge containing a deflagrating fuel charge and so constructed that, when fired, at least a part of the deflagrating fuel charge contained therein will be ejected therefrom in a solid and incompletely consumed state; the said deflagrating fuel charge consisting of 80% to 99% by weight of colloided nitrocellulose grains and 1% to 20% by weight of a modified granular fuel that is less quenchable than the said colloided nitrocellulose grains and comprising a colloided mixture of nitrocellulose and nitroglycerine.

2. A propulsive, projectile-free, prime-mover actuating type of fuel cartridge containing a deflagrating fuel charge and so constructed that when fired in a prime-mover system comprising an expansion chamber at least a part of the deflagrating fuel charge contained in the cartridge will be expelled therefrom in a solid and incompletely consumed state; the said deflagrating fuel charge comprising a preponderance of grains of colloided nitrocellulose and a minor proportion of other grains of colloided nitrocellulose having a quenchableness reducing means incorporated therethrough, said other grains of colloided nitrocellulose being materially less quenchable than the said first-mentioned nitrocellulose grains and being of such nature as to maintain the said fuel charge in an ignited state as and when the cartridge is fired and the said fuel is ignited and expelled therefrom into an expansion chamber, as that of a prime-mover system.

3. A fuel cartridge as recited in claim 2 and in which the said other grains of colloided nitrocellulose comprise a colloided mixture of nitrocellulose and nitroglycerine.

4. A fuel cartridge as recited in claim 2 and in which the said other grains of colloided nitrocellulose comprise colloided nitrocellulose, nitroglycerine and an oxygen delivering substance, and are present in an amount not greater than 20% by weight of the total fuel charge.

5. A fuel cartridge as recited in claim 2 and in which the fuel charge consists of 80 to 99% by weight of said first-mentioned grains of colloided nitrocellulose and 1 to 20% by weight of said other grains of colloided nitrocellulose.

6. A propulsive, projectile-free, prime-mover actuating type of fuel cartridge containing an igniting element and a deflagrating fuel charge and so constructed that when fired in a prime-mover system comprising an expansion chamber at least a part of the deflagrating fuel charge contained in the cartridge will be expelled therefrom in a solid and incompletely consumed state; the said deflagrating fuel charge comprising a preponderance of grains of colloided nitrocellulose and a minor proportion of other grains of colloided nitrocellulose having a quenchableness reducing means incorporated therethrough, said other grains of colloided nitrocellulose being adjacent the igniting element and the said first-mentioned grains of colloided nitrocellulose being superimposed on the said other grains, said other grains of colloided nitrocellulose being materially less quenchable than the first-mentioned nitrocellulose grains and being of such nature as to maintain the said fuel charge in an ignited state as and when the cartridge is fired and said fuel is ignited and expelled therefrom into an expansion chamber, as that of a prime-mover system.

7. A fuel cartridge as recited in claim 6 and in which the said other grains of colloided nitrocellulose comprise a colloided mixture of nitrocellulose and nitroglycerine.

8. A fuel cartridge as recited in claim 6 and in which the said other grains of colloided nitrocellulose comprise colloided nitrocellulose, nitroglycerine and an oxygen delivering substance, and are present in an amount not greater than 20% by weight of the total fuel charge.

9. A fuel cartridge as recited in claim 6 and in which the fuel charge consists of 80 to 99% by weight of said first-mentioned grains of colloided nitrocellulose and 1 to 20% by weight of said other grains of colloided nitrocellulose.

CARL D. PRATT.